United States Patent Office 3,124,041
Patented Mar. 10, 1964

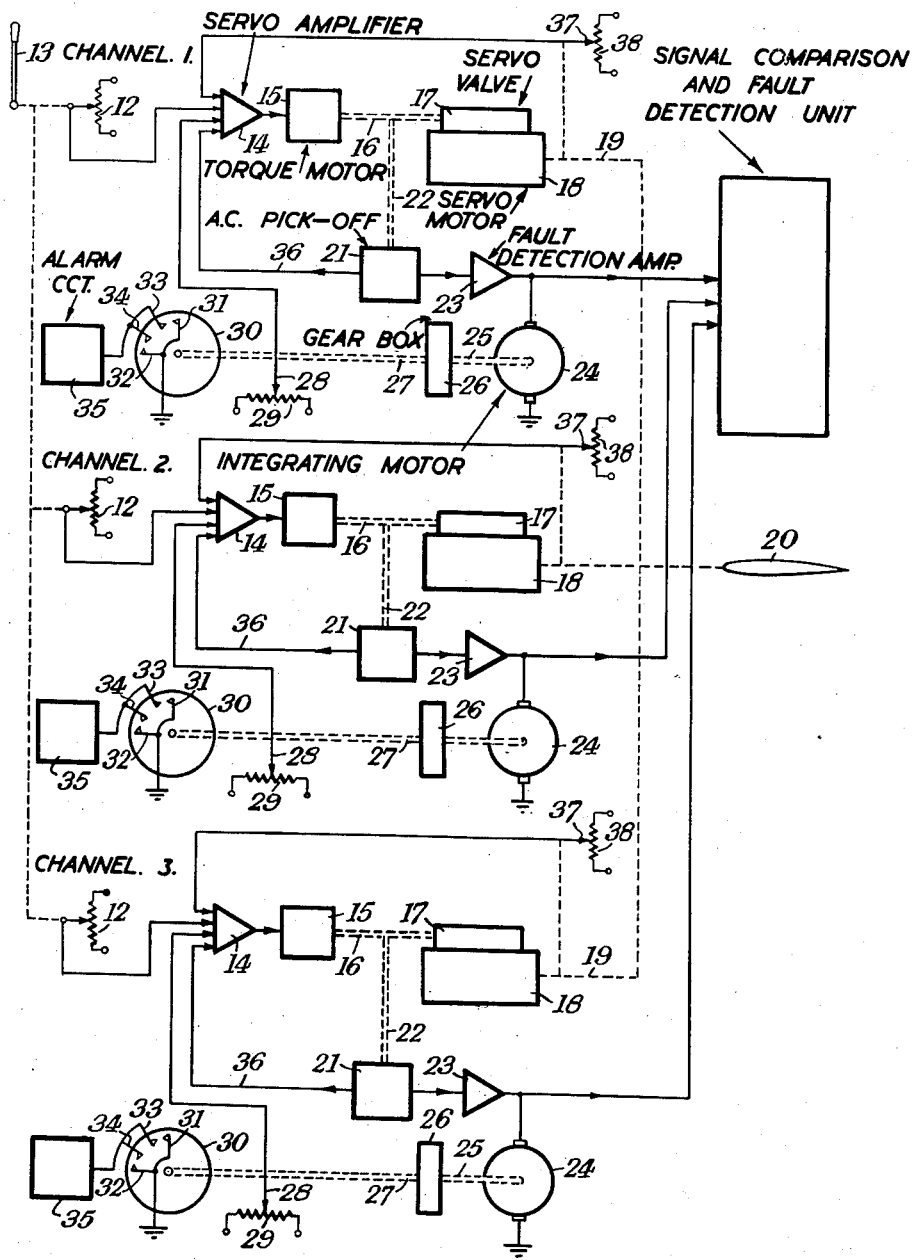

3,124,041
ELECTRO-HYDRAULIC CONTROL SERVO-MECHANISMS
George McMurtry, Belfast, and James Stark, Newtown-abbey, Northern Ireland, assignors to Short Brothers & Harland Limited, Belfast, Northern Ireland
Filed Mar. 21, 1962, Ser. No. 181,372
Claims priority, application Great Britain Apr. 10, 1961
7 Claims. (Cl. 91—1)

In electro-hydraulic control systems incorporating servo-motor mechanisms, it is customary to multiplicate the servo-motor mechanisms in order to provide the necessary degree of reliability and safety. When using multiplicated servo control systems, and especially in aerodyne control apparatus, it is desirable and often essential to detect a fault in any channel of the system, so that the pilot or controller may be made aware of the reduction in the standard of safety remaining in the system and thereby warned of the necessity for taking remedial action, or to indicate to him that the faulty channel has been isolated and is defective.

In the co-pending application of Colhoun Serial No. 42,782 now Patent No. 3,095,784, there is described an electro-hydraulic servo system comprising a common input control member and a common output member and at least three independent channels for the transmission of signals from the input control member to the output member, each channel comprising a motor adapted to be controlled by control signals developed by movement of the input control member and coupled to operate a hydraulic servo valve controlling the supply of hydraulic fluid to a hydraulic servo motor mechanically coupled to drive the said common output member, means for comparing the position of the servo valve in each of the channels or the position of a member mechanically coupled thereto with the position of the hydraulic valve or mechanically coupled member in each of two of the other channels, and warning means responsive to a disparity between the valve or member positions to indicate the identity of a defective channel.

In the preferred embodiment described in the said co-pending application the means for comparing the servo valve positions comprises signal generating means in respect of each channel, adapted to generate a position signal which varies in accordance with variations in the position of the valve and a comparison unit for comparing the valve-position signals to detect any disparity therebetween.

It has been found that random drift of the input control signal can cause wrong fault indication upon the occurrence of a true fault.

With the object of overcoming this drawback at least to some extent in such a control system there is provided according to the present invention, in respect of each channel, a feedback loop for feeding back a signal representative of the first time integral of the valve position error signal.

The effect of employing such a feedback loop is to decrease the low frequency loop gain by increasing the amount of negative feedback at low frequencies, thereby reducing low frequency drift errors.

Preferably, the arrangement is such that the feedback signal is effective for drift rates below a predetermined level, any excessive drift rates being indicated as faults by the warning means.

In the preferred arrangement according to this invention means are provided whereby when the amplitude of the integrated position signal exceeds a predetermined level in either sense a separate switching circuit is operated to indicate a faulty channel.

One embodiment of the invention will now be described by way of example with reference to the accompanying drawing which is a block schematic diagram of a triplicated electro-hydraulic servo system according to the invention for controlling a control surface of an aircraft in response to movements of a pilot's control column.

Referring to the drawing, the triplicated system comprises three channels I, II and III, each of which includes a potentiometer 12 for generating an electrical signal which varies in amplitude in accordance with variations in the position of the pilot's control column 13. These electrical signals are applied to a high-gain amplifier 14 where they are amplified and from which they are transmitted to control a torque motor 15 mechanically connected through a shaft 16 to operate a spool valve 17 of a hydraulic servo motor 18. An output shaft 19 of the servo motor is mechanically coupled to mechanism for operating the aircraft control surface 20.

In addition, there is provided a conventional pick-off device 21 which is mechanically coupled by a shaft 22 to the output shaft 16 and which is arranged to generate an electrical position signal representative of the position of the shaft 16. This position signal is amplified in an amplifier 23 and applied to a signal comparison unit of the fault detection system described in the said co-pending application Serial No. 42,782, now Patent No. 3,095,784.

The amplified position signal is also applied to drive an integrating electric motor 24, so that the position of the output shaft 25 of the integrating motor 24 represents the first time integral of the position signal applied thereto. The output shaft 25 is connected to reduction gearing 26, the output shaft 27 of which drives the wiper 28 of a potentiometer 29 so as to produce an electrical signal proportional to the integral of the position signal. The signal developed by the potentiometer is employed as a feedback signal and is fed back to the input of the channel servo-amplifier 14. The drive shaft 27 for the wiper 28 is also arranged to drive a disc 30 forming part of a limit switch. The disc 30 carries two earthed contacts 31 and 32 adapted to cooperate with two stationary contacts 33 and 34 connected to a channel alarm circuit 35, and the arrangement is such that the alarm circuit 35 is closed to indicate a faulty channel when the amplitude of angular movement of the shaft 27 exceeds a predetermined value in either sense.

The apparatus so far described constitutes one channel of the triplicated electro-hydraulic servo system. In the present embodiment three identical channels I, II and III are employed in parallel between the control column 13 and the aircraft's control surface 20. The signals representative of the control column movement are applied in parallel to the inputs of the three channel servo amplifiers and the output shafts of the three servo motors are mechanically connected to the drive mechanism for the control surface.

In the preferred embodiment of the invention there is provided in respect of each channel a feedback path 36 between the output of the torque motor 15 and the input of the channel servo amplifier 14. This feedback path includes the pick-off device 21, hereinbefore referred to, which is arranged to generate a further electrical output position signal, this further position signal being fed back direct to the input of the channel servo amplifier 14.

Following common practice, the output shaft 19 of the serve motor 18 in each channel is coupled to drive a wiper 37 of a further potentiometer 38 so as to generate a feedback signal which is also fed back to the input of the channel servo amplifier 14.

What we claim is:
1. An electro-hydraulic servo system comprising a common input control member and a common output member, at least three independent channels for the transmission of signals from the input control member to the output member, each channel comprising a first motor adapted to be controlled by control signals developed by movement of the input control member, a hydraulic servo motor mechanically coupled to drive the said common output member, a hydraulic servo valve operated by said first motor for controlling the flow of hydraulic fluid to said servo motor, means in each channel to generate a valve signal representative of the position of the servo valve, and feedback means for each channel and including an integrator connected to integrate the valve-position signal to generate a feedback signal representative of the first time integral of the valve-position signal, and means to feed back said feedback signal to said channel.

2. A system according to claim 1, wherein each integrator is an integrating motor, and wherein each feedback means includes means to apply the valve-position signal to said integrating motor to generate a mechanical output which represents the first time integral of the signal, and a potentiometer having a wiper connected to be driven by the mechanical output of the motor to produce an electrical signal representative of the first time integral.

3. A system according to claim 2, wherein each of said first motor has an output shaft and each valve-position signal generating means includes a pick-off device connected to be driven by the output shaft of the respective first motor for generating said valve-position signal.

4. A system according to claim 3, wherein the feedback means includes an amplifier connected to amplify the signals generated by the pick-off device and wherein the integrating motor is connected to be driven by the output of the amplifier.

5. A system according to claim 3, comprising in each channel a servo amplifier and means to apply signals developed by movement of the input control member to said servo amplifier and wherein the said means to feed back said feedback signals to the channel includes means to apply said feedback signals to the input of the servo amplifier.

6. A system according to claim 5, comprising further feedback means for each channel to apply signals generated by the pick-off device direct to the input of the channel servo amplifier.

7. A system according to claim 1, comprising means responsive to the amplitude of the integrated valve-position signal exceeding a predetermined level in either sense to indicate a faulty channel.

References Cited in the file of this patent

UNITED STATES PATENTS

| | | |
|---|---|---|
| 2,894,491 | Hecht | July 14, 1959 |
| 2,898,889 | Foster | Aug. 11, 1959 |
| 3,017,865 | Frantz et al. | Jan. 23, 1962 |
| 3,070,071 | Cooper | Dec. 25, 1962 |